UNITED STATES PATENT OFFICE.

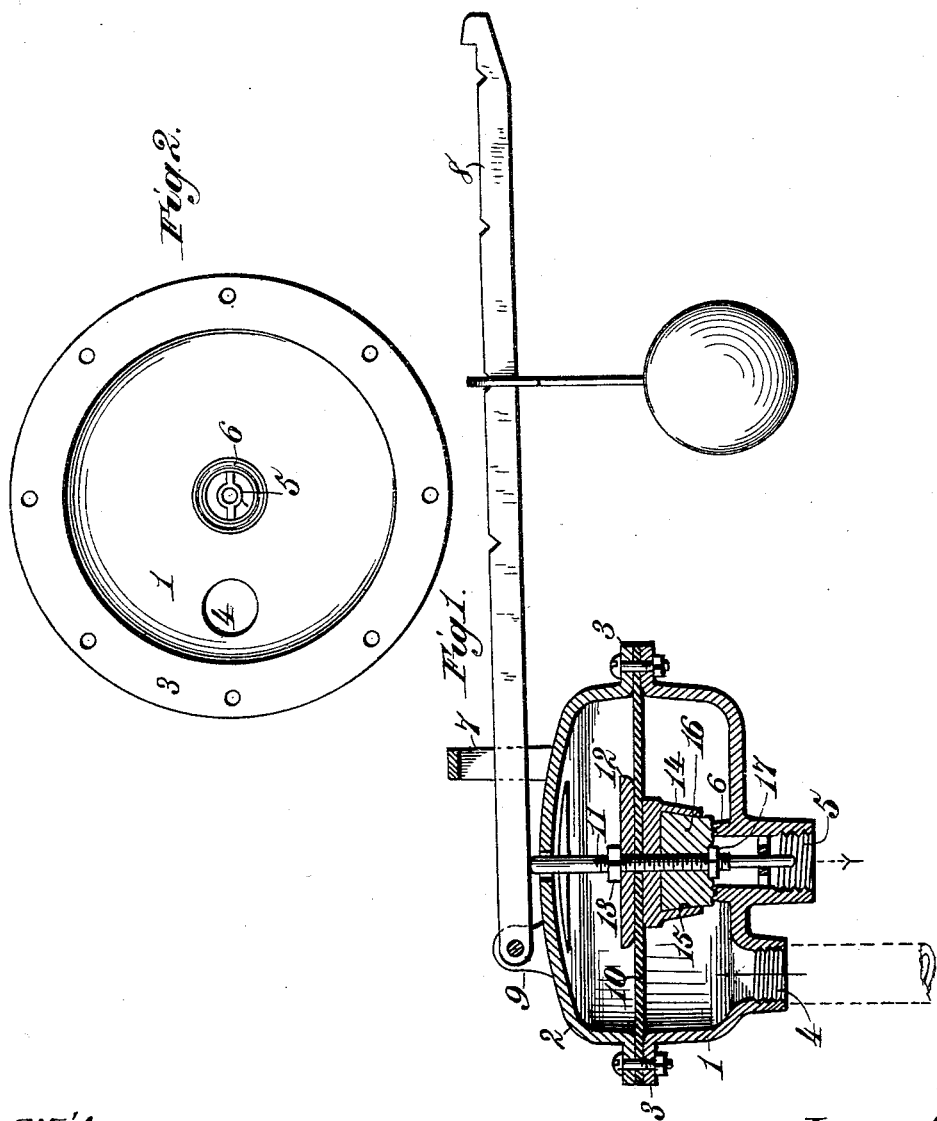

THOMAS A. BRYAN, OF BALTIMORE, MARYLAND.

SAFETY-VALVE.

SPECIFICATION forming part of Letters Patent No. 633,421, dated September 19, 1899.

Application filed May 18, 1899. Serial No. 717,372. (No model.)

*To all whom it may concern:*

Be it known that I, THOMAS A. BRYAN, a citizen of the United States, residing at Baltimore city, in the State of Maryland, have invented new and useful Improvements in Safety-Valves, of which the following is a specification.

My invention relates to safety-valves, the object of the same being to provide novel means whereby a close and effectual seal may be made between the valve and its seat and a valve which will promptly return to its closing position when the excess of pressure to which it is set has been removed.

Other objects of the invention will hereinafter appear.

In the ordinary device of this character it is common to cast both the valve and its seat of metal and afterward grind these parts to make a perfect fit. This, however, is an expensive operation, and, moreover, a valve constructed in this manner will not reseat itself until the pressure has fallen far below that to which it was set to operate. It has also been proposed to employ a rubber disk as the valve; but this also is objectionable in that the suction to which the valve is subjected will cause the same to yield or stretch, and thereby fail to open or close at the proper time. By my invention these objections are overcome; and the same consists is certain details of construction and combinations of parts, which will be hereinafter described and claimed.

In the drawings forming part of this specification, Figure 1 is a vertical central sectional view illustrative of my invention, and Fig. 2 is a plan view of the valve-seat.

Like reference-numerals indicate like parts in both views.

The valve-casing is made up of the two sections 1 and 2, each having a flange 3 thereon, through which pass the screws by which they are secured to each other. The lower section 1 is provided with an inlet-port 4 and a discharge port or opening 5, at the upper end of which is the valve-seat 6, the said seat being cast with the section on which it is formed. The upper section 2 is provided with a slotted upright 7, which serves as a guide for the adjusting-lever 8, which is fulcrumed upon lugs 9 9 on said section and is notched at intervals along its upper edge for the reception of weights. Secured along its edges, between the flanges 3 3 of the two sections 1 and 2, is a diaphragm 10, the same being constructed of soft rubber or other flexible material. Extending through the center of the diaphragm 10 is the threaded valve-stem 11, the same projecting at its upper end through and above the section 2 and supporting the adjusting-lever 8. A metallic disk or washer 12 surrounds the stem 11, rests upon the upper surface of the diaphragm 10, and is clamped in place thereon by a nut 13.

Below the diaphragm 10 is secured a metallic cup 14, the same being formed with a dovetailed recess or cavity 15, which receives the block 16 of soft rubber or other like yielding material constituting the valve. The said block is held in place in said recess by the nut 17. The block is originally in cylindrical form, and in this form is inserted into the recess 15. As the nut 13, the washer 12, the block 16, and the nut 17 are all securely clamped to the diaphragm 10 and upon the stem 11, the block 16 is compressed vertically and forced outwardly, thereby expanding its upper end portion into contact with the diverging side walls of the cavity 15, and is thereby held against stretching movement in the direction of its length. It projects slightly, however, beyond the cavity in the cup 14 and is adapted to bear with a yielding pressure upon the valve-seat 6. The said seat therefore can be used in the condition in which it is originally cast—that is, grinding of the seat becomes unnecessary, as the yielding material of which the valve is made will compensate for any unevenness in the surface of said seat.

My improved valve is particularly designed for use with gases under pressure where the temperature of said gases is low. It is, however, not restricted to this use, although it will be found most effective under such conditions, as the material of which the valve is made will be unaffected.

The operation of the device, except as above set forth, is similar to that of the ordinary diaphragm safety-valve and requires no specific description herein.

Having now described my invention, what I claim as new, and desire to secure by Letters Patent, is—

1. The combination with a valve-seat, of a cup having a converging internal surface, a yielding block expanded at one end in said cup, a screw-threaded valve-stem extending through the block and cup, and nuts mounted on the valve-stem above the cup and below the block, respectively, and operating when screwed up on the valve-stem to compress said block and expand one end thereof against the converging internal surface of the cup, substantially as described.

2. The combination with a valve-casing having a valve-seat, of a cup having a converging internal surface, a yielding block expanded at one end in said cup, a screw-threaded valve-stem passing through the cup and block and extending through the valve-casing, nuts mounted on the valve-stem above the cup and below the block, respectively, and operating when screwed up on the valve-stem to compress said block and expand one end thereof against the converging internal surface of the cup, and a valve-seating device acting on the outer end of said valve-stem, substantially as described.

3. In a safety-valve, the combination with a valve-seat and a flexible diaphragm, of a metallic cup secured to said diaphragm, having a dovetailed cavity therein, a disk also secured to said diaphragm opposite said cup, a block of rubber or other yielding material, constituting the valve proper, in said cavity, a threaded valve-stem extending through said disk, diaphragm, cup and block, and nuts upon the ends of said stem for compressing and spreading said block and for securing said parts together.

In testimony whereof I have hereunto set my hand in presence of two subscribing witnesses.

THOMAS A. BRYAN.

Witnesses:
PHIL. WITTMER,
WM. H. JONES.